Sept. 27, 1938.  C. D. GOODSELL  2,131,028
PHOTOELECTRIC CONTROL SYSTEM
Filed April 9, 1937    2 Sheets-Sheet 1

Inventor:
Charles D. Goodsell,
By Potter, Pierce & Scheffler,
Attorneys.

Sept. 27, 1938.  C. D. GOODSELL  2,131,028
PHOTOELECTRIC CONTROL SYSTEM
Filed April 9, 1937   2 Sheets-Sheet 2
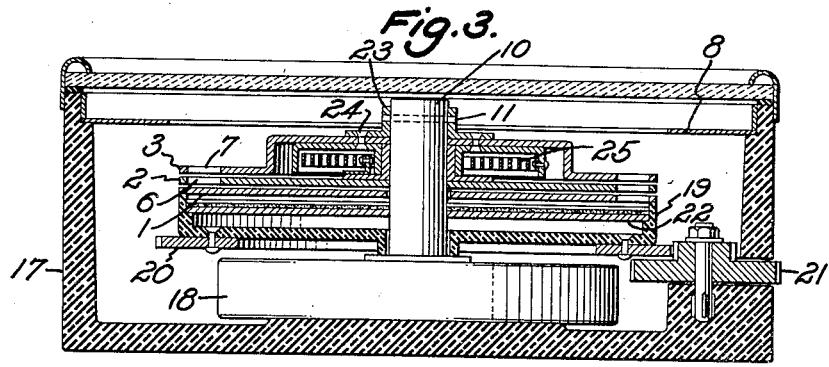
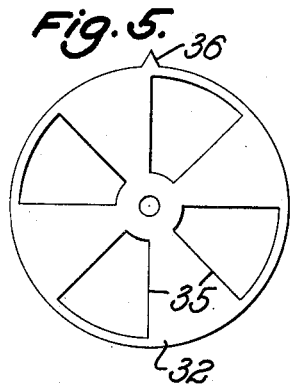
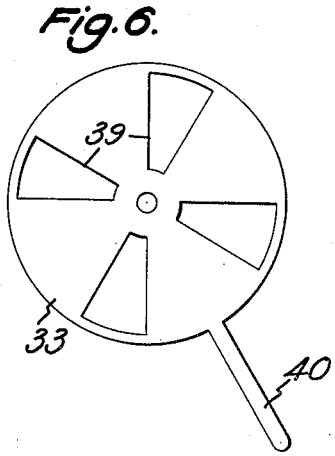
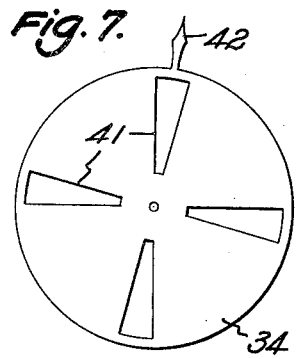
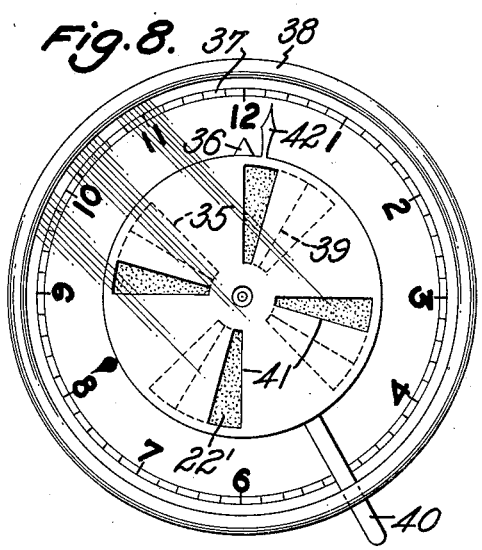
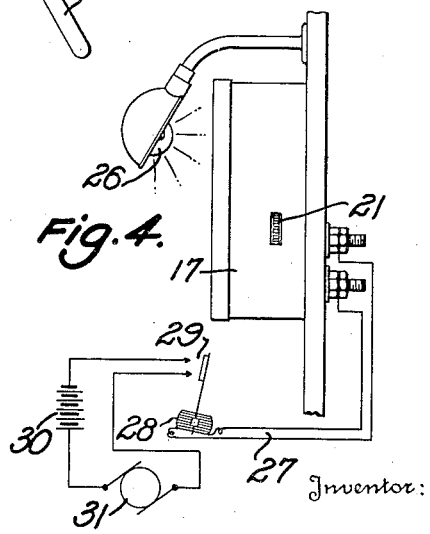
Inventor:
Charles D. Goodsell,
By Potter, Pierce + Scheffler,
Attorneys.

Patented Sept. 27, 1938

2,131,028

UNITED STATES PATENT OFFICE 2,131,028

PHOTOELECTRIC CONTROL SYSTEM

Charles D. Goodsell, Hillside, N. J., assignor to Weston Electrical Instrument Corporation, Newark, N. J., a corporation of New Jersey Application April 9, 1937, Serial No. 136,030

8 Claims. (Cl. 250—41.5)

This invention relates to photoelectric control systems, and more particularly to control systems including an apertured diaphragm or light valve that may be actuated by various types of mechanisms to establish or to interrupt the passage of a beam of light to a photoelectric cell.

An object of the invention is to provide control systems including a photoelectric cell, a source of light, and a light valve in the form of a plurality of relatively adjustable diaphragms; the diaphragms each having a plurality of light-transmitting apertures. An object is to provide a control system including a light valve that may be actuated by the staff of a measuring instrument. A further object is to provide a light valve that may be secured to the staff of a measuring instrument; the light valve including a ported disk that may be adjusted about the staff to place the "control point" of the system at any desired position upon the graduated scale of the measuring instrument. More particularly, an object is to provide a light valve of the type last stated which includes, in addition to the relatively stationary but adjustable ported disk, two apertured disks that are movable with the instrument staff, one disk being a valve disk fixed to the staff and the other being spring-connected to the valve disk; the relatively stationary disk and the third disk having cooperating stops for arresting the third disk when the instrument pointer reaches the selected control point.

Another object of the invention is to provide photoelectric control systems in which the light valving elements have a multiplicity of relatively narrow ports, whereby a quick on-and-off control action is obtained by a relatively small displacement of one of the elements with respect to the other elements. Other objects are to provide photoelectric control systems including three relatively movable elements each having a multiplicity of apertures; one element being stationary, a second element being adjustable to determine the length of a control action, and the third element being displaced on a time basis to control the passage of a plurality of light beams to a photoelectric cell.

These and other objects and advantages of the invention will be apparent from the following specification when taken with the accompanying drawings in which:

Fig. 3 is a transverse central section through the instrument and light valve as seen on line 3—3 of Fig. 2;

Fig. 4 is a side elevation of the instrument and a light source, the electrical connections of the photocell and control circuit being shown diagrammatically;

Figs. 5, 6 and 7 are elevations of the three apertured disks of a light valve adapted to be driven by a clock mechanism; and Fig. 8 is a front elevation of a clock provided with a light valve including the said disks.

Figure 1:
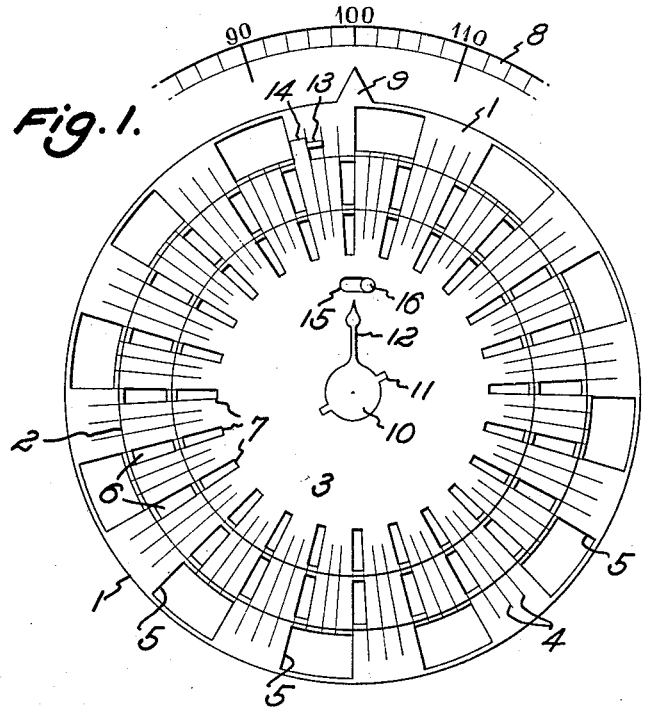
Fig. 1 is a schematic view of an embodiment of the invention as applied to a measuring instrument, the view showing the relationship of the multiple apertures of three disks (of equal diameter in an actual construction) when the instrument pointer stands at the selected control point of the system.

The schematic view, Fig. 1, is illustrative of an embodiment of the invention that is adapted to be secured to the staff of a measuring instrument to control a power source in such manner as to maintain a function or quantity; such as pressure, temperature, humidity, voltage or the like; constant within close limits about a selected control point. The light valving system includes the disks 1, 2, 3 which, for clearness of illustration in this schematic view, are shown as of different diameter. The radial construction lines 4 are uniformly spaced and indicate that the ported disk 1 has a number of sectorial apertures 5 that, in the aggregate, have a circumferential width of substantially 180°, and that disks 2 and 3 have twice that number of narrow sectorial apertures 6, 7, respectively, the total circumferential width of the ports 6 and 7 being substantially 90°. The disk 1 is relatively stationary but is angularly adjustable with respect to a graduated scale 8 and has a pointer 9 that may be set at a particular scale graduation to select the control point of the system.

Figure 2:
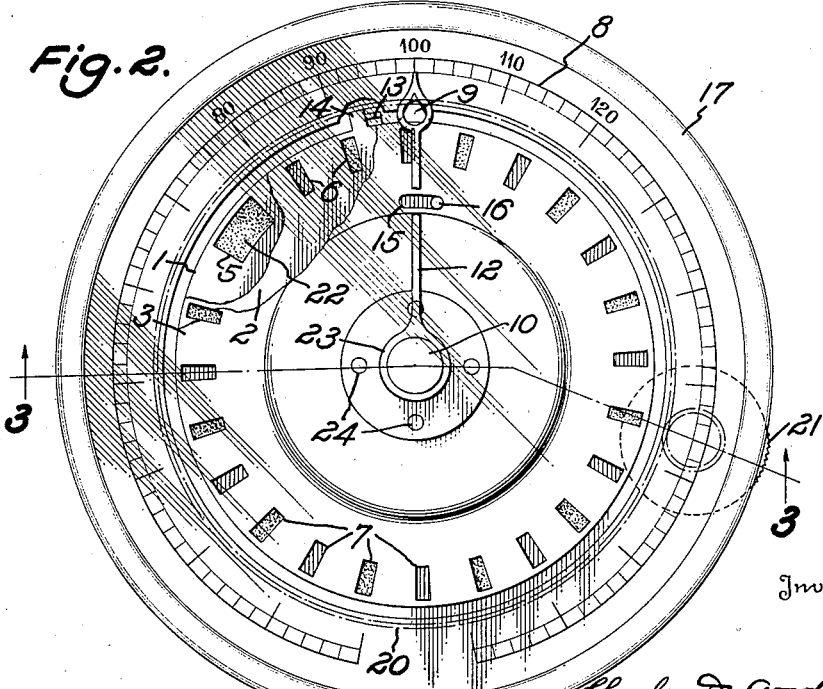
Fig. 2 is a front elevation of a measuring instrument which includes a light valve of the type shown schematically in Fig. 1.

The valve disk 3 is keyed to the instrument staff 10, as indicated by the lugs 11 in Fig. 1, and the staff 10 carries a pointer 12 for cooperation with the scale 8. The disk 1 and the intermediate disk 2, hereinafter designated the "vernier" disk, have cooperating stop elements 13, 14, respectively, which engage to prevent further clockwise movement of the vernier disk when, as shown in Figs. 1 and 2, the instrument pointer 12 stands as the selected control point on the scale 8. The disk 3 has a slot 15 into which a pin 16 on the disk 2 projects, the angular extent of the slot 15 corresponding to a relative movement of disks 2 and 3 equal to three times the circumferential width of the apertures in disks 2 and 3.

Assuming that means is provided for normally urging the disk 2 clockwise with respect to disk 3, it will be noted that the apertures in these disks are continuously alined as these disks are moved clockwise by the staff 10 as the latter displaces the instrument pointer towards the selected control point. The total area of the light passages through the three disks during this period is substantially constant and equal to one-half the total area of the ports 7 in disk 3. This condition results from the relative width of ports 6, 7 and ports 5 since, as alternate sets of alined ports 6, 7 pass beyond the ports 5, the other set of alined ports 6, 7 move over the ports 5. When, as illustrated in Fig. 1, the pointer 12 reaches the control point, the stops 13, 14 engage to prevent further movement of the vernier disk 2. An increase in the measured value of the factor to which the instrument responds will effect a further clockwise movement of disk 3 and will carry the ports 6, 7 out of alinement. The passage of light through the ports is thereby interrupted and, by appropriate control elements, the source of energy which affects the measured quantity is reduced in value or is interrupted. If, through inertia or a failure of the control system, the measured value continues to increase, the light beam cannot be established by the further clockwise rotation of disk 3 since the pin 16 will engage the opposite end of slot 15 to arrest the movement of the disk 3.

An application of this system to a pressure measuring instrument is illustrated in Figs. 2 to 4. A casing 17 houses a pressure response element 18 which rotates the staff 10 and pointer 12 to indicate pressure on the instrument scale 8. The disk 1 is secured to a shell or cup 19 to which is attached the ring gear 20 that meshes with a thumb wheel 21 that projects through the casing 17. The wheel 21 may be rotated to adjust the pointer 9 of disk 1 to the desired control point, for example the "100" graduations on scale 8. A photoelectric cell 22 is supported by the cup 19, the cell being preferably of the barrier layer or current generating type. The valve disk 3 is secured to the hub 23 of the instrument pointer 12 by rivets 24, and a spiral spring 25 is connected between the valve disk 3 and vernier disk 2 to urge the latter in clockwise direction.

As shown in Fig. 4, a source of light 26 is mounted in front of the casing 17 and illuminates the cell 22 when ports of the several disks are alined. A control circuit in which a current flow is established by the illumination of the photocell is shown diagrammatically as leads 27 extending from terminals on the instrument casing to a relay 28 that controls switch 29 in the power circuit which includes a source of current 30 and a load device 31. When the measuring instrument is the steam pressure gauge of a boiler, the load device 31 may be a motor which operates the oil and air pumps of a fuel burner, or it may be any known type of control device for regulating the energy input to the boiler.

The operation of the apparatus shown in Figs. 2 to 4, inclusive, will be apparent from a consideration of Fig. 1. It is assumed that the disk 1 has been adjusted to place the pointer 9 at the desired pressure which is to be maintained by the control of the heating medium. The openings 6 and 7 of the vernier disk 2 and valve disk 3 are continuously alined so long as the steam pressure is below the selected control point. A substantially constant area of the photocell 22 will therefore be illuminated as the steam pressure builds up from zero to the desired value which, as shown in Figs. 1 and 2, is 100 pounds. The controlled unit 31 is continuously energized to supply heat to the furnace during this period, as the illumination of the photocell energizes relay 28 to close the switch 29. The stop members 13, 14 on disks 1 and 2, respectively, engage when the instrument pointer 12 reaches the selected control point or the "100" mark on the dial 8. A further increase in the steam pressure results in the clockwise rotation of a staff 10, pointer 12 and valve disk 3. The vernier disk remains stationary due to the engagement of the stop members. The increased pressure thus produces a relative movement of disks 2 and 3 which carries the ports 7 of disk 3 out of alinement with ports 6 of disk 2. The illumination of the photocell is cut off, current no longer flows in the relay circuit and the switch 29 drops to open position to de-energize the heat supply unit 31. In the illustrated construction, this complete blocking of the photocell corresponds to a pressure rise of about 2 pounds per square inch. If the pressure continues to rise after the interruption of the fuel supply, the instrument pointer will move clockwise to indicate the actual steam pressure until this movement of disk 3 is arrested by the engagement of the left end of slot 15 with the pin 16 of disk 2. Further relative movement of disks 2 and 3 is thus prevented and it is impossible to obtain a false control action or renewed heat supply by an abnormal rise in pressure above the selected control point. When the pressure decreases to the control point, the slots 6 and 7 are again alined, and light passes to the photocell to energize the relay 28 to close the power circuit.

It is to be noted that the multiplicity of ports results in a quick change of the effective cell area between zero and its maximum value upon a relatively small angular movement of the valve disk 3 with reference to the vernier disk 2. This change in the effective area of the cell simulates an on-off control and not a modulating control. The total exposed area could be substantially increased by extending the radial length of the several slots. The range of movement for a control action is much smaller than was the case with prior devices in which the same effective cell area was exposed through a single set of alined openings into relatively movable disks.

In the form of the invention which is illustrated in Figs. 5 to 8, inclusive, the inner disk 32 and an intermediate disk 33 are relatively stationary, while the valve disk 34 is rotated by a clock mechanism. The disk 32 has a number of equally spaced apertures 35 of uniform size that have a total area approximately one-half that of the disk. The disk 32 has a pointer 36 for indicating the relative location of the ports 35 with respect to the graduations 37 on the face of the clock 38. Disk 33 has uniformly spaced apertures 39 of less circumferential extent than the apertures 35 of disk 32, and a handle 40 projects from disk 33 to facilitate the angular adjustment of disk 33 to control the effective circumferential length and the angular arrangement of the alined openings in disks 32, 33. The disk 34 also has a plurality of uniformly spaced ports 41 of relatively narrow width. The disk 34 is mounted on the minute staff of the clock 38 and has a pointer 42 which serves as the minute hand.

As illustrated, each disk has four openings and the openings of the several disks therefore aline four times in each hour to pass light to the photocell 22' that is arranged back of the inner disk 32.

This type of control is appropriate in numerous chemical and manufacturing plants where a series of operations are to be performed in recurrent cycles. The length of a complete cycle may be adjusted to meet different conditions by changing the number of ports in the disks or by changing the speed of rotation of the valve disk. The relative length of the on and off periods within a cycle may be controlled by adjustment of the vernier disk 33 with reference to the disk 32.

The same arrangement of three relatively movable disks with multiple apertures may be applied to various types of machines in which periodic control actions are to be timed with reference to the accumulated travel of a movable element of the machine.

The described embodiments of the invention are illustrative of the adaptability of the light valve and photo-electric control system to various uses in connection with measuring instruments, clock mechanisms, machinery and the like, but it is to be understood that the invention is not limited to the specific constructions herein illustrated and described and that various changes may be made without departing from the spirit of my invention as set forth in the following claims.

I claim:

1. A control system comprising a source of light, photoelectric means, and means for controlling the passage of light from said source to said photoelectric means; said controlling means comprising a relatively stationary member having a plurality of apertures therethrough, a pair of apertured members each having a plurality of similarly located apertures therethrough, means for displacing one member of said pair, means tending to retain said pair of members in predetermined relation during displacement of said one member thereof, and means for arresting movement of the other member of said pair when it reaches a predetermined position, whereby further displacement of said one member of the pair results in relative movement of the members of said pair.

2. A control system as claimed in claim 1, wherein said members are apertured disks, and said means for displacing one member of the pair is the staff of an instrument.

3. A control system comprising a source of light, a photoelectric cell, control means energized by current flow from said cell, and means for controlling the passage of light from said source to said cell; said controlling means comprising an instrument having a staff for displacing a pointer over a graduated scale in accordance with variations in a function affected by said control means, an apertured light-valving disk secured to said staff, a similarly apertured disk and yielding means tending to retain said disks with the apertures thereof in alinement, a third and relatively stationary apertured disk adjustable angularly about said staff, and cooperating stop means on said second and third disks for arresting movement of said second disk when the staff displaces said pointer into alinement with a selected control point on said scale whereby further displacement of said staff and pointer effects relative movement of the light-valving disk and the second disk.

4. A control system as claimed in claim 3, wherein said light-valving and second disks each have a plurality of uniformly spaced and relatively narrow apertures therethrough, and said third disk has one-half the number of apertures of the light-valving disk, the total circumferential width of the apertures of the third disk being substantially 180°.

5. In an instrument-actuated photoelectric control system, the combination with a measuring instrument including a rotatable staff for displacing a pointer over a graduated scale, of a photoelectric cell, a source of light, and a light valve; said light valve comprising a valve disk secured to said staff and having a plurality of spaced sectorially shaped ports, a vernier disk having similarly located ports, means connecting said disks for limited angular movement, spring means tending to retain said disks with the ports thereof in alinement, a third apertured disk having one-half the number of ports of said first two disks, the ports of said third disk having a total circumferential width of substantially 180°, whereby light apertures of substantially constant area are provided as the first two disks are simultaneously rotated by said staff with reference to the third disk, stop means on said vernier and third disk for arresting said vernier disk, and means for angularly adjusting said third disk about said staff to determine the position of engagement of said stop means with respect to the position of the instrument pointer on the graduated scale.

6. The invention as claimed in claim 5, wherein the means connecting said valve disk and vernier disk restricts the relative movement thereof to not more than the angular spacing of two adjacent ports of said valve disks.

7. A control system including a photoelectric cell, a source of light, and a light valve positioned between said source and said cell; said light valve comprising at least three disks each having a set of sector shaped slots, the slots of the several disks being circumferentially spaced for the simultaneous alinement of a plurality of slots of the several disks upon a predetermined angular adjustment of the disks; means for rotating one of said disks, and means for adjusting each of the other disks to determine both the angular location and the effective circumferential length of a light-transmitting port that may be established through the alined apertures of the several disks.

8. A control system as claimed in claim 7, wherein the means for rotating one of said disks comprises a clock mechanism.

CHARLES D. GOODSELL.